June 18, 1968  C. E. BUSHNELL, JR., ET AL  3,389,199
PROCESS OF MAKING A REINFORCED CELLULAR THERMOPLASTIC SHEET
Filed June 1, 1962
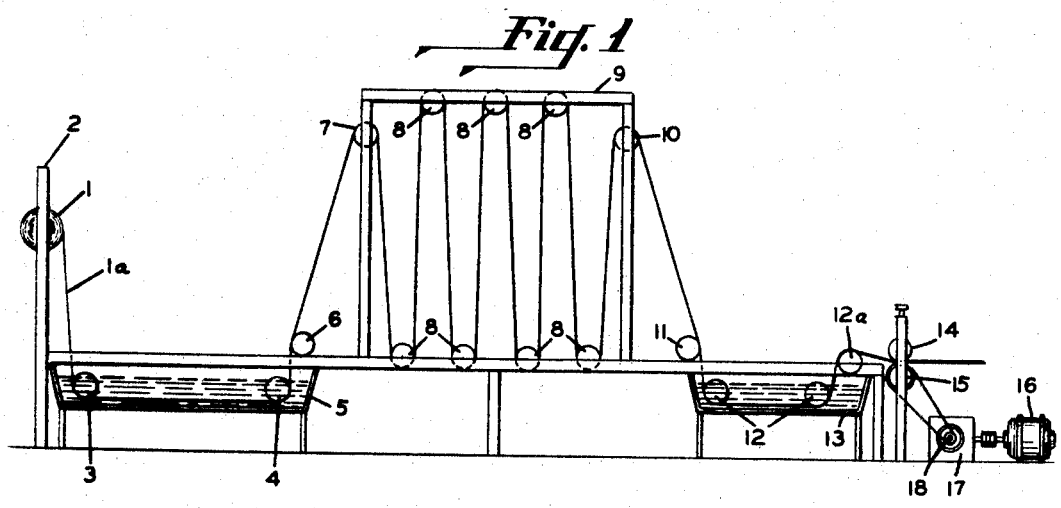
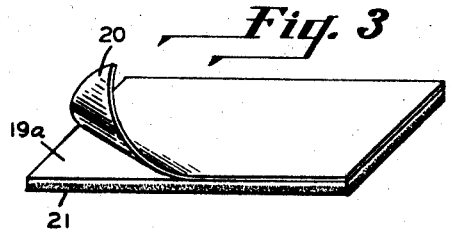
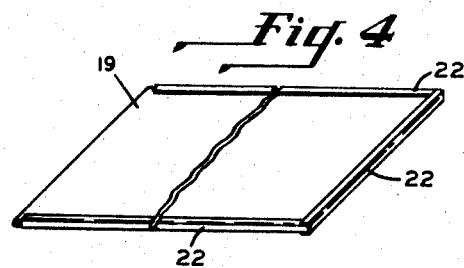
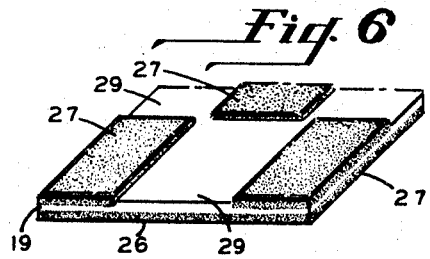
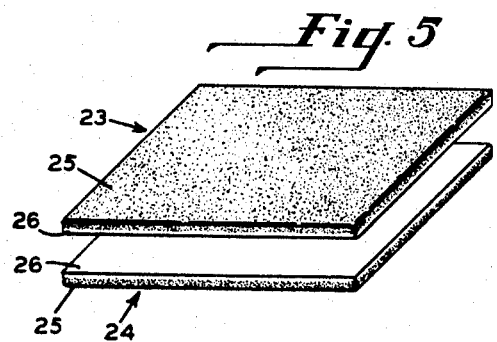
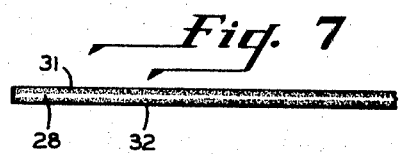

PROCESS OF MAKING A REINFORCED CELLULAR THERMOPLASTIC SHEET
Collins E. Bushnell, Jr., Manheim Township, Lancaster County, Harry F. Long, East Hempfield Township, Lancaster County, and Richard C. Stadden, Manor Township, Lancaster County, Pa., assignors to Armstrong Cork Company, Lancaster, Pa., a corporation of Pennsylvania
Filed June 1, 1962, Ser. No. 199,465
15 Claims. (Cl. 264—53)

This invention relates to the method of forming a cellular surfaced thermoplastic sheet. More particularly, this invention relates to the method of forming it wherein an outer surface or surfaces of a thermoplastic sheet are foamed by a controlled and selective steeping process which leaves integral therewith an unmodified, substantially impervious reinforcing portion composed of the original sheet.

This method allows the formation from a single sheet of thermoplastic material of a foam-skin structure or a foamed sheet having an interior reinforcing portion. In either case, the unfoamed portion will consist of an unmodified, integral, substantially impervious reinforcing portion composed of a portion of the original sheet. The operation may be continuous and the process may be easily controlled to obtain an end product having a desired thickness of either the expanded portion or the reinforcing unexpanded portion.

The lightweight cushioning properties, resistance to deteriorating influences, insulating value, etc., of foamed thermoplastic materials such as foamed polystyrene, for example, have long been recognized and numerous attempts have been made to utilize these properties in the manufacture of cushioning and lining materials and shaped articles of various kinds. It would be highly desirable, for example, to have a thermoplastic sheet with a resilient cushioning surface and a reinforcing smooth impervious skin integral therewith. The skin would provide a surface on the foamed material which could be easily cleaned and which would be adapted to receive printing or decoration and be far less susceptible to damage than the surface of the ordinary expanded sheet.

For some other purposes, it would be desirable to have foamed resilient surfaces on both sides of an unfoamed sheet of thermoplastic material to provide a strengthened cushioning material. Such material would be used in many applications such as the aforementioned cushioning and lining materials.

Previous attempts to solve these problems have involved such means of strengthening the foamed sheet as laminating another strengthening material thereto by means of bonding agents or by chemical reaction between the foamed sheet and the reinforcing material. Softening and compacting of the surface cells of cellular thermoplastic material, as well as hot and cold molding processes, have also been tried to provide a strengthening portion on or in an expanded thermoplastic material.

In some of the molding processes, the pressure of the confined expanding material against the particles in contact with the heated mold walls combined with a partial fusion resulting from the greater heating at this interface causes a skin to be formed on the surface of the foamed material by limiting or eliminating expansion thereof. This skin is usually rather thin, however, and the thickness thereof cannot be easily or accurately controlled. In the case of cold molding processes wherein a self-expanding material is used, the skin is sometimes formed by the cooling effect of the walls of the unheated mold on the expandable particles in contact therewith, causing them to only partially expand or to not expand at all. In this process, again, the problem of predetermining the thickness and quality of the skin exists. These processes are also unusable for relatively thin sheets such as those to which the present invention is particularly applicable.

Coating materials such as paint and lacquers have been tried as a surfacing layer for foamed thermoplastic material but at best they provide only a relatively thin film which affords very little protection. Prior attempts have also been made to produce a strengthened thermoplastic foam cushioning material comprising foamed outer surfaces and an unfoamed inner layer. These have included various laminating and molding techniques which have involved undesirable time, care, and expense.

It has also previously been proposed to steep thermoplastic sheets in an agent capable of expanding the sheet upon heating thereof. One such method is disclosed in U.S. Patent 2,681,321. The method comprises soaking the thermoplastic sheets in a volatile, aliphatic hydrocarbon such as petroleum ether until the sheet has absorbed the hydrocarbon. The sheet is then heated to activate the expanding agent after which it is cooled. Although the process is useful for the purpose intended, it is extremely time-consuming, requiring from 25 minutes for a 0.3 mm. sheet to 28 days for a 3 mm. sheet to absorb a sufficient quantity of the volatile, aliphatic hydrocarbon to produce foamable sheets having specific gravities of 0.02 and 0.048, respectively. The product formed by this process does not result in the type of skin-reinforced foamed structure or the reinforced foam-surfaced sheet of the present invention and does not incorporate the desirable features previously discussed.

None of the foregoing processes lends itself to a one-operation type of continuous production, nor does it provide for simple efficient control of thickness of the expanded and unexpanded portions of the materials in such an operation. In contrast with the relatively complicated, costly procedures and undesirable results of the prior processes, the present invention accomplishes the desired results in a relatively simple and efficient manner, saving much of the time, effort, and expense usually experienced in forming a product of this type.

It is an object of this invention to provide an integral, unitary structure, one embodiment of which comprises a single thermoplastic sheet having foamed surfaces and an unmodified core. It is still another object of this invention to provide a simple, continuous, time-saving and less expensive method of forming a foamed thermoplastic sheet having a strengthening inner core. It is a still further object of this invention to provide a method of forming a foam-surfaced thermoplastic sheet wherein the thickness of the foamed surface and the unmodified inner portion and the density of the foamed portions may be easily controlled. Another object of this invention is the provision of a method for forming a non-laminated cellular-surfaced thermoplastic sheet wherein the need for molds, adhesives, and laminating procedures are eliminated along with the necessity of coping with dimensional changes normally occurring when foamed materials are produced. It is a further object of this invention to provide an integral foam and reinforcing protecting skin structure from a single, unitary thermoplastic sheet.

These objects are realized by the present invention which, briefly stated, comprises immersing a thermoplastic sheet in a concentration of an expanding agent or an expanding agent and a solvent for the sheet for a period of time and at a temperature all predetermined to result in penetration of the expanding agent or solvent-expanding agents into the sheet to a degree predetermined to result in the desired thickness of the foamed and unfoamed portions. Following immersion, the sheet may be allowed an aging period of a minute or more for penetration of the expanding agent and any solvent used therewith and drying followed by application of heat to simultaneously bring the plastic to its softening temperature and volatilize the expanding agent.

In the drawings,

FIG. 1 is a diagrammatic view of one form of an apparatus used in forming a sheet according to the invention.

FIG. 2 is a cross-sectional view showing a thermoplastic sheet with masking tape thereon.

FIG. 3 is a perspective view showing the sheet of FIG. 2 after it has been processed and with the masking tape peeled back.

FIG. 4 is a perspective view showing a modified method of masking one surface of a sheet by folding the sheet and sealing the edges.

FIG. 5 is a perspective view showing two foam-surfaced thermoplastic sheets made according to the invention using the folded sheet of FIG. 4.

FIG. 6 is a perspective view showing a partially foamed sheet on which only selected portions were masked before processing.

FIG. 7 is an elevational view showing a portion of a foamed sheet made according to the invention having foamed surfaces and an integral, inner reinforcing layer consisting of a portion of the original sheet.

As the base material for an article made according to the invention, there is employed a single plain sheet of thermoplastic material such as polystyrene. In addition to polystyrene itself, other suitable organic thermoplastic sheets may be made of modified polystyrene materials, that is, any material having a polystyrene base with additives to change certain physical or chemical properties without changing the basic nature of the polystyrene. In addition to polystyrene and its copolymers, other materials from which sheets usable in this invention may be made include, for example, methacrylate polymers, cellulose acetate butyrate, polycarbonates and poly(vinyl butyral). In one embodiment of the invention, the sheet may be, for example a 5 mil thick sheet of the polystyrene from which it is desired to form a foam-skin structure. To one surface of the sheet may be applied any of the commercially available pressure-sensitive masking tapes so that upon immersion of the sheet into the expanding agent the surface of the polystyrene film in contact with the tape will not be penetrated by any solvent which may be used with the expanding agent. The adhesives on these tapes adhere to the sheet and are not affected by the hydrocarbon steeping medium.

One form of an appropriate apparatus for carrying out the invention is diagrammatically shown in FIG. 1 of the drawings. This apparatus consists of three basic sections, a steeping bath, a section for surface drying and penetration of expanding agent, and a foaming section consisting of a hot water bath. Exposure times in each section have been made independently adjustable for any given line speed.

In FIG. 1, a roll 1 of masked thermoplastic sheet material 1a which may be, for example, polystyrene, is mounted on a roll supporting standard 2. The masked sheet 1a passes from roll 1 under adjustable guide rolls 3 and 4 located in the steeping tank 5, where it is subjected to the action of the solvent-expanding agent which may be, for example, petroleum ether. The length of time of immersion of the polystyrene sheet in the solvent-expanding agent is proportional to the depth of penetration desired. Optimum times and ranges will be discussed below. However, it may be said here that exposure times are far shorter than those employed in conventional bead steeping, being on the order of a few seconds to several minutes.

After immersion, the masked sheet 1a carrying the solvent-expanding agent passes out of the steeping bath over adjustable guide roll 6 and over adjustable festooning roll 7. The treated sheet then moves through the festooning apparatus comprising nonadjustable festooning rolls 8, mounted on a frame 9. A period of a minute or more is allowed for penetration and drying of the sheet in its passage therethrough. As the masked sheet 1a leaves the festooning apparatus, it passes over adjustable rolls 10 and 11 and under guide rolls 12 located in the hot water expansion tank 13. It is here that the unmasked surface of the polystyrene sheet becomes softened and is expanded into a spongy, cellular or porous material. The foamed masked sheet then passes over roll 12a and through squeeze rolls 14 and 15 which are driven by a motor 16 through a gear reduction unit 17 and a belt and pulley arrangement 18. These squeeze rolls serve a threefold purpose. They squeeze out some of the water, they have a pressure adjustment to permit control of density of the foam, and they transmit the drive force to the foam resulting in a uniform pull through the system. The partially foamed masked sheet is then cooled and the masking removed, after which the foam-surfaced sheet may be fabricated into the desired shapes. It may be compressed slightly if so desired, or it may be run through fluting rolls to provide a corrugated structure for use as packings, etc.

In FIG. 2 of the drawings wherein the masket sheet 1a of FIG. 1 is shown in section and to an enlarged scale, the thermoplastic sheet is designated by the numeral 19 and the masking material thereon by the numeral 20. Masking of the sheet 19 prior to the above processing results, as shown in FIG. 3, in the retention of an unchanged portion 19a of the original thermoplastic sheet 19. This smooth, substantially impervious reinforcing facing 19a is integrally attached to the resilient, spongy opposing surface 21 and is well adapted to receive printing or decoration. It will also be far less susceptible to damage than the expanded surface of the ordinary expanded sheet.

Another method of forming a cellular surfaced thermoplastic sheet having an integral, smooth, impervious reinforcing skin composed of a portion of the original sheet thereon comprises using the thermoplastic film itself as a barrier material. As shown in FIG. 4 of the drawings, a thermoplastic sheet 19 of polycarbonate resin film may be folded and the edges sealed by heat or, as in this case, by tape 22 and the sheet processed as in the foregoing example. This technique permits foaming of only the outer surfaces of the sheet and, as shown in FIG. 5, by slitting the sealed edges, provides two sheets 23 and 24 having integral foamed and unfoamed portions 25 and 26 formed in one continuous operation.

Barrier materials other than pressure-sensitive masking tapes may be applied to the smooth surface of the polystyrene sheet to keep the surface from being penetrated by the steeping medium. Among these are resinous or elastomeric coatings which may be applied, if desired, by brush or stencil to selected portions of a surface to provide a foamed and unfoamed design thereon by allowing the expanding agent and any solvent which may be used therewith to contact only the uncoated portions of the sheet. A sheet resulting from such a process is shown in FIG. 6 of the drawings, wherein the thermoplastic sheet 19 bears design forming foamed portions 27, a foamed surface 28, and unmodified surface portions 29. The chief criteria of these coatings are adhesion, lack of solvent action on the base material, and insensitivity from attack by the steeping medium. Latex dispersion coatings of poly(vinyl chloride) and poly(vinyl acetate) are good in such usage. These are partially dried in order that the mechanical friction encountered in passage through the steeping bath does not destroy them.

In another embodiment of this invention, an unmasked sheet of thermoplastic film was subjected to the controlled steeping, drying, and foaming process previously described, resulting in the formation of a foam-surfaced thermoplastic sheet such as that shown in FIG. 7 of the drawings having a residual strengthing interior portion composed of the unmodified original sheet 19. The presence of this solid core 30, particularly if it is comprised of the highly oriented unmodified base material, imparts considerable reinforcement to the foamed portions 31 and 32 of the integral structure.

With regard to the thickness of the film or sheet which may be employed, no maximum thickness limit has been found insofar as application of the process to produce a surface foam layer is concerned. In a preferred embodiment of the invention, however, starting thicknesses in the range of from 5 mils to 30 mils have produced the best results.

The rate of absorption of the sheet or film usable in this invention can also be controlled through: (1) modification with fillers or nucleating agents, (2) leaching out of internally dispersed, soluble, incompatible substances, (3) through incorporation of an inert fibrous matrix, (4) through a mechanical means such as perforation or knurling of a surface, and (5) through altering the temperature of the sheet or film prior to immersion. It is important to note here that the thickness of the foamed surfaces and the unmodified inner portion as well as the density of the foamed portions may be easily controlled through regulation of certain critical variables in the steep-expansion process.

When the foam-surfaced sheet of this invention is made in a continuous process, a combination of solvent-expanding agents may be used to shorten the time necessary for the base material to absorb sufficient expanding agent to result in the desired end product. A variety of aliphatic and two aromatic hydrocarbon systems have been found to produce a foam by the steep-expansion method. In the interest of safe handling, however, chlorinated systems have received chief emphasis. Best results with polystyrene have been attained using combinations of trichloromonofluoromethanes, boiling point 74.8 F., and methylene chloride, boiling point 104.3° F. Optimum level for the trichloromonofluoromethane is 90–100% of the total by weight. Although 100% of either component will produce a foam, methylene chloride alone tends to produce a very coarse celled, blistered structure due to excessive solvent action. The purpose of the minor constituent is to increase the solvency of the system thereby accelerating its absorption into the sheet. Therefore, a measure of control over absorption or steeping time lies in regulation of the ratio of trichloromonofluoromethane to methylene chloride.

Alternate liquid expanding agents which either alone or in mixtures have been found to foam polystyrene are: petroleum ether, pentane, hexane, heptane, acetone, ethyl acetate, methyl ethyl ketone, methyl chloroform, carbon tetrachloride, trichloroethylene, ethyl ether, isopropyl ether, benzene, and cyclohexane.

As previously stated, the depth of expanding agent penetration into the polystyrene film is proportional to steep time. For example, immersion time for 5 mil film using a 95:5 ratio of trichloromonofluoromethane to methylene chloride can range from a quick dip to approximately 45 seconds. Beyond this time the film dissolves to the point where it cannot be handled. In the above solution, a 10-second dip at 70° F. will result in approximately 20% thickness penetration on each side. Thus with a 5 mil starting thickness, a 3 mil unfoamed core remains after expansion.

It has been found that optimum results with the 95:5 trichloromonofluoromethane-methylene chloride system have been attained when the temperature of the steeping bath has been kept between 68° F. and 74° F. The rate of absorption is considerably retarded below 68° F., and above 74° F. excessive evaporation occurs.

While control of the drying and penetration time occurring between the steeping bath and the expanding hot water bath is not highly critical, the optimum time for these thin sheets has been found to be 120 seconds. If the elapsed time between these two points is too low, surface blister formation and a superficial foam layer may result. If the time is extended beyond 3 minutes, excessive penetration occurs and the core is lost. Without the unmodified core, the film extends in both transverse and machine directions as well as in thickness with accompanying curling and distortion. The result is an entirely different product from the one with which this invention is concerned.

The following examples will further illustrate the invention but the invention is not limited to these examples. All parts and percentages are by weight unless otherwise stated.

Example 1

A foam-surfaced thermoplastic sheet with an unmodified center core was formed by immersing a 5 mil sheet of polystyrene in a steeping bath of 95% trichloromonofluoromethane and 5% methylene chloride at a temperture of 70° F. for a period of 11 seconds. The sheet containing the solvent-expanding agent was then removed from the steeping bath and allowed to dry for 2 minutes at 77° F. to complete the desired penetration of the solvent-expanding agent into the sheet. The sheet was then immersed for 10 seconds in a bath of boiling water at which time it became soft and pliable and foaming of the portion of the sheet containing the expanding agent took place. The sheet was removed from the expanding bath and passed between squeeze rolls and dried. The resulting foam-surfaced sheet was considerably reinforced by the unmodified center core and was well adapted to uses requiring lightweight cushioning and insulating properties.

EXAMPLE 2

A foam-skin structure was formed by applying a pressure-sensitive masking tape to one surface of a 5 mil film of polystyrene and repeating the procedure of Example 1 using identical times and temperatures. The masking tape was removed and the resulting sheet was an integral structure comprising a resilient foamed portion on one side and a smooth unmodified portion of the original sheet on the other. The smooth surface of this sheet is well adapted to receive printing or decoration and serves as an impermeable reinforcing portion which can be used where these qualities as well as a combination of resistance to damage and cushioning or insulating are required.

Example 3

Two sheets having a foam-skin structure were formed simultaneously by folding a sheet of polycarbonate resin and taping the edges together. The folded sheet was immersed in a 50:50 solution of trichloromonofluoromethane and methylene chloride for 10 seconds. After removal from the solution the folded sheet was allowed a 2-minute period for drying and sufficient penetration of the solvent-expanding agent into the sheet. The folded sheet was then heated in an oven at 350° F. for 5 minutes to foam the portion thereof penetrated by the expanding agent after which the folded sheet was slit at the edges resulting in two foam-surfaced sheets.

Example 4

A sheet having selectively foamed portions was formed by masking selected portions of one side of a sheet of cellulose acetate butyrate and immersing it in a steeping bath of a 50:50 solution of petroleum ether and methyl ethyl ketone at 77° F. for 2 minutes. The sheet was removed from the bath and a 2-minute period was allowed for drying and completion of penetration of the solvent-expanding agent after which it was immersed in boiling water for 10 seconds where one surface and the portions of the other surface penetrated by the solvent-expanding agent foamed readily. The sheet was then passed between squeeze rolls to remove entrapped water and dried. This type of sheet is useful where extra specific area cushioning or insulation is needed. It has the advantage of being an integral unit which can be applied and used as such. Depending on the requirements, the surface having portions only thereof expanded can be faced outwardly to provide an embossed design appearance while the opposite side provides a resilient cushioning surface.

Example 5

A foam design was formed on a sheet of polystyrene by applying to selected areas of one surface thereof a coating of a latex dispersion of poly(vinyl chloride), partially drying the coating and repeating the process of Example 1, using like times and temperatures. The barrier coating was removed from the dry sheet resulting in an integral structure comprising a sheet which is foam-surfaced on one side and selectively foamed on the other in the areas which were not covered by the coating material. This sheet is usable for purposes similar to those mentioned in Example 4.

We claim:

1. A method for producing foam surfaced polystyrene articles which comprises steeping the surface area to be foamed of the polystyrene articles in a liquid foaming agent consisting of a mixture of trichloromonofluoromethane and methylene chloride for a period of time sufficient to achieve partial penetration of said foaming agent through the articles, said trichloromonofluoromethane being present in said foaming agent mixture in the amount of at least 90% based on the total weight of the mixture, removing the polystyrene articles from said foaming agent and heating the articles to produce foamed surfaces at the areas heated and which was in contact with the foaming agent.

2. A method for producing a thermoplastic sheet having foamed and unfoamed portions comprising masking selected portions of the sheet's surface with a material which is impermeable to the subsequently applied expanding agent for said sheet, steeping the partially covered sheet in a foaming agent therefor for a period of time sufficient to achieve partial and incomplete penetration of the foaming agent through the thickness of the sheet in the exposed portions thereof, removing the sheet from the expanding agent, exposing the sheet to heat to foam the steeped portions thereof, and removing said impermeable material therefrom to expose the unfoamed portions of the sheet.

3. The process of claim 2 wherein the foaming agent consists of a mixture of a poor solvent for said thermoplastic sheet and a good solvent for said thermoplastic sheet.

4. The process of claim 3 wherein the foaming agent consists of a major proportion of the poor solvent and a minor proportion of the good solvent.

5. A process according to claim 4 wherein the thermoplastic sheet material is polystyrene and the foaming agent consists of a mixture of trichloromonofluoromethane and methylene chloride.

6. A process according to claim 2 wherein the thermoplastic sheet material is polycarbonate resin and the foaming agent is a mixture of trichloromonofluoromethane and methylene chloride.

7. A process according to claim 2 wherein the thermoplastic sheet material is cellulose acetate butyrate and the foaming agent is petroleum ether and methyl ethyl ketone.

8. A process for forming a foam-surfaced thermoplastic sheet having an unfoamed reinforcing backing integral therewith, said process comprising masking one surface of said sheet with a material which is impermeable to the action of a foaming agent for said thermoplastic sheet, steeping said masked sheet in said foaming agent for the thermoplastic material for a period of time sufficient to achieve partial and incomplete penetration of the foaming agent through the thickness of the sheet in the steeped unmasked surface, removing said masked sheet from the foaming agent, immersing the sheet in a hot water bath to soften and make pliable the steeped surface of the sheet and cause expansion thereof by the absorbed foaming agent, passing the foamed sheet from the bath through squeeze rolls capable of exerting sufficient pressure to remove entrapped water from the foamed portions of the sheet and increase the density thereof without crushing the cells thereof, and removing the masking material to expose the unfoamed reinforcing backing.

9. The process of claim 8 wherein selected areas only of the sheet's surface are masked to produce a sheet having one surface having foamed and unfoamed portions thereon integral with an unfoamed backing.

10. A process for simultaneously forming two foam-surfaced sheets from a single thermoplastic sheet, each foam-surfaced sheet having an integral reinforcing skin on one surface thereof comprising folding a sheet of thermoplastic material and sealing the edge portions thereof, steeping said folded sheet in a foaming agent for a period of time sufficient to achieve partial and incomplete penetration of the foaming agent through the thickness of the sheet, removing the sheet from the foaming agent, immersing the sheet in a hot water bath at a temperature in the range of from about 180° F. to 230° F. for a period of about 10 seconds to foam the steeped surfaces of the sheet, removing the sheet from the bath and passing it through squeeze rolls capable of exerting sufficient pressure to remove entrapped water from the foamed portions of said sheet without crushing the cells thereof, drying the sheet and unsealing the edges thereof.

11. A method for producing a thermoplastic sheet having foamed and unfoamed portions comprising adhesively attaching to selected portions of the sheet's surface a material which is impermeable to the subsequently applied expanding agent for said sheet, steeping the partially covered sheet in a foaming agent therefor for a period of time sufficient to achieve partial and incomplete penetration of the foaming agent through the thickness of the sheet in the exposed portions thereof, removing the sheet from the expanding agent, exposing the sheet to heat to foam the steeped portions thereof, and removing said impermeable material therefrom to expose the unfoamed portions of the sheet.

12. A method for producing a partially foam-surfaced thermoplastic sheet comprising applying to selected areas of said sheet a latex dispersion, drying the latex to make it impermeable to a subsequently applied expanding agent, steeping the partially coated and dried sheet in an expanding agent for said sheet for a period of time sufficient to achieve partial and incomplete penetration of the foaming agent through the thickness of the sheet in the areas not coated with said dried latex, removing the sheet from the expanding agent, exposing the sheet to heat to foam the steeped portions thereof, and removing the dried latex therefrom to expose the unfoamed portions of the sheet.

13. The method of claim 12 wherein the latex dispersion coating is poly(vinyl chloride).

14. A method for producing in a continuous operation from a single sheet a foam-surfaced polystyrene sheet having an integral unfoamed reinforcing layer consisting of a part of the original sheet which comprises progressively immersing a sheet of polystyrene of a thickness in the range of from about 5 mils to 30 mils for about 10 seconds in a steeping bath containing a foaming agent for said sheet to achieve partial and incomplete penetration of the foaming agent through the thickness of the sheet, said foaming agent consisting of 95% by weight trichloromonofluoromethane and 5% by weight methylene chloride based on the total weight of the foaming agent at a temperature of said foaming agent in the range of about 68° F. to 74° F., progressively removing the sheet from the steeping bath, ageing the steeped sheet for a period of about 2 minutes at room temperature and atmospheric pressure to permit further penetration of the foaming agent into the sheet to achieve a total penetration of the foaming agent thereinto to a depth less than the total thickness of the sheet, progressively immersing the aged sheet in a hot water bath at a temperature in the range of from about 180° F. to 230° F. for a period of about 10 seconds to soften and make pliable the aged sheet surfaces and cause foaming thereof by the absorbed foaming agent, and passing the foam-surfaced sheet from the bath through squeeze rolls capable of exerting pressure sufficient to remove entrapped water from said foamed surfaces of the sheet without crushing the cells thereof, and drying the sheet.

15. The process for selectively foaming predetermined surface areas on a plastic article wherein the article is exposed to a medium which is absorbable by the plastic which comprises coating an initially designated surface portion of a plastic article with a fluid substance which serves as a barrier against the medium which is absorbable by the plastic, exposing a secondarily designated surface portion of said article which includes at least a portion of said initially designated surface portion to said medium which is absorbable by the plastic and applying heat to the plastic article to produce a foam covering at the exposed and previously uncoated areas.

References Cited

UNITED STATES PATENTS

| | | | |
|---|---|---|---|
| 3,026,273 | 3/1962 | Engles | 264—53 XR |
| 3,262,625 | 7/1966 | Russell et al. | 264—53 |
| 2,655,485 | 10/1953 | Hoffman | 260—2.5 |
| 2,805,208 | 9/1957 | Roche | 260—2.5 |
| 2,526,311 | 10/1950 | Wilson | 161—159 |
| 2,816,852 | 12/1957 | Banks | 161—160 |
| 2,689,980 | 9/1954 | Opavsky | 264—25 |
| 2,920,977 | 1/1960 | Adams | 264—45 X |
| 2,825,282 | 3/1958 | Gergen et al. | 264—25 X |
| 2,964,799 | 12/1960 | Roggi et al. | 264—47 |
| 3,042,972 | 7/1962 | Lafferty | 264—53 |

FOREIGN PATENTS

| | | |
|---|---|---|
| 916,116 | 8/1954 | Germany. |
| 155,819 | 3/1954 | Australia. |
| 545,399 | 8/1957 | Canada. |
| 850,634 | 10/1960 | Great Britain. |
| 1,180,049 | 6/1959 | France. |

OTHER REFERENCES

BASF Booklet (translated): Stastny, Fritz, "Styropor—New Porous Synthetic" (BASF reprint from Kunststoffe, 44 (1954), No. 4, pp. 173–180, and No. 5, pp. 221–226), see pp. 1–8 of this booklet.

JAMES A. SEIDLECK, Primary Examiner.

A. H. BRODMERKEL, M. SUSSMAN, Examiners.

P. E. ANDERSON, Assistant Examiner.

UNITED STATES PATENT OFFICE
CERTIFICATE OF CORRECTION

Patent No. 3,389,199                      June 18, 1968

Collins E. Bushnell, Jr., et al.

It is certified that error appears in the above identified patent and that said Letters Patent are hereby corrected as shown below:

In the drawing, Fig. 7, the numeral "28" should read -- 30 --; in Fig. 6, the numeral "26" should read -- 28 -- and the lead line of numeral 27 on the right side of Fig. 6 should extend to the design-forming foamed face portion of the sheet. Column 4, line 23, "masket" should read -- masked --. Column 5, line 35, "74.8 F" should read -- 74.8° F --.

Signed and sealed this 9th day of December 1969.

(SEAL)
Attest:

EDWARD M. FLETCHER, JR.            WILLIAM E. SCHUYLER, JR.
Attesting Officer                     Commissioner of Patents